(12) United States Patent
Walker et al.

(10) Patent No.: US 12,252,349 B2
(45) Date of Patent: Mar. 18, 2025

(54) GRAIN BIN UNLOAD TROUGH CONVEYOR AUGER HANGER ASSEMBLY AND METHOD

(71) Applicant: CTB, Inc., Milford, IN (US)

(72) Inventors: Jeffrey E. Walker, Fort Wayne, IN (US); Adam K. Gutwein, Goshen, IN (US); Mark S. Dingeldein, Milford, IN (US)

(73) Assignee: CTB, Inc., Milford, IN (US)

( * ) Notice: Subject to any disclaimer, the term of this patent is extended or adjusted under 35 U.S.C. 154(b) by 0 days.

(21) Appl. No.: 18/594,441

(22) Filed: Mar. 4, 2024

(65) Prior Publication Data

US 2024/0208735 A1   Jun. 27, 2024

Related U.S. Application Data

(62) Division of application No. 17/025,021, filed on Sep. 18, 2020, now Pat. No. 11,952,218.

(Continued)

(51) Int. Cl.
*B65G 33/32* (2006.01)
*A01F 25/20* (2006.01)
(Continued)

(52) U.S. Cl.
CPC .......... *B65G 33/14* (2013.01); *A01F 25/2018* (2013.01)

(58) Field of Classification Search
CPC ........ B65G 33/14; B65G 33/32; A01F 25/20; F16C 17/02; F16C 35/02
(Continued)

(56) References Cited

U.S. PATENT DOCUMENTS 3,215,257 A   11/1965   Teunis
4,077,508 A    3/1978   Pedersen
(Continued)

FOREIGN PATENT DOCUMENTS

CN   201400460 Y   2/2010
GB     2510028 A   7/2014
(Continued)

OTHER PUBLICATIONS

US 2014/0367226 A1, Marchesini et al., Dec. 18, 2014.*
(Continued)

*Primary Examiner* — Douglas A Hess
(74) *Attorney, Agent, or Firm* — Harness, Dickey & Pierce, P.L.C.

(57) ABSTRACT

A method of positioning a grain bin unload conveyor auger within a grain bin unload conveyor trough includes positioning an auger hanger on a pair of hanger support shelves at an open exterior end of the grain bin unload conveyor trough to support the grain bin unload conveyor auger away from adjacent interior surfaces of the grain bin unload conveyor trough, and pushing the grain bin unload conveyor auger through the open exterior end of the grain bin unload conveyor trough to cause the auger hanger to continuously support the grain bin unload conveyor auger away from the interior surfaces of the grain bin unload conveyor trough as the auger hanger moves longitudinally along the pair of hanger support shelves from the open exterior end to a final operational position of the auger hanger between the open exterior end and an interior end of the grain bin unload conveyor trough.

9 Claims, 8 Drawing Sheets

Related U.S. Application Data

(60) Provisional application No. 62/912,341, filed on Oct. 8, 2019.

(51) Int. Cl.
  *B65G 33/14* (2006.01)
  *F16C 17/02* (2006.01)
  *F16C 35/02* (2006.01)

(58) Field of Classification Search
  USPC .......................... 198/860.3; 384/441; 29/428
  See application file for complete search history.

(56) References Cited

U.S. PATENT DOCUMENTS

| | | | |
|---|---|---|---|
| 5,370,464 A | 12/1994 | Blaha | |
| 5,797,480 A * | 8/1998 | Gaddis | B65G 65/46 198/860.4 |
| 7,461,902 B1 | 12/2008 | Darst | |
| 7,523,996 B1 * | 4/2009 | Darst | F16C 25/04 384/213 |
| 8,136,654 B2 | 3/2012 | Moreland et al. | |
| 8,403,128 B2 | 3/2013 | Farrell et al. | |
| 9,108,804 B2 | 8/2015 | Marchesini et al. | |
| 9,717,256 B2 | 8/2017 | Shell | |
| 9,752,621 B2 | 9/2017 | Olson | |
| 10,105,819 B2 * | 10/2018 | Ray | F16C 33/7856 |
| 10,160,605 B1 | 12/2018 | Foster et al. | |
| 10,537,112 B2 | 1/2020 | Shell | |
| 11,091,250 B2 * | 8/2021 | Hilliard | F15B 15/1471 |
| 11,661,559 B2 * | 5/2023 | Kelfkens | C10J 3/503 422/139 |
| 11,952,218 B2 * | 4/2024 | Walker | B65G 33/14 |
| 2011/0114451 A1 | 5/2011 | Moreland et al. | |

FOREIGN PATENT DOCUMENTS

| | | |
|---|---|---|
| HU | 161039 | 1/1974 |
| HU | 177647 B | 11/1981 |

OTHER PUBLICATIONS

US 2019/0090495 A1, Shell, Mar. 28, 2019.*
BROCK®, U-Trough Bin Unload System, 24'-60' Models, Assembly & Operation Manual, Part No. 30553R6, Revised Jul. 29, 2015.
International Search Report and Written Opinion regarding International Application No. PCT/US2020/053533, dated Jan. 18, 2021.
Examiner's Requisition mailed on May 5, 2022, in corresponding Canadian Application No. 3,094,443.
Hungarian Search Report regarding Application No. P2200163, mailed Jun. 28, 2022.

* cited by examiner

GRAIN BIN UNLOAD TROUGH CONVEYOR AUGER HANGER ASSEMBLY AND METHOD

CROSS-REFERENCE TO RELATED APPLICATIONS

This application is a divisional of U.S. application Ser. No. 17/025,021, filed on Sep. 18, 2020, which claims the benefit of U.S. Provisional Application No. 62/912,341, filed on Oct. 8, 2019. The entire disclosure of each of the above applications is incorporated herein by reference.

FIELD

The present disclosure relates to grain bin unload trough conveyors and, in particular, to assemblies and methods for properly positioning an auger within a trough.

BACKGROUND

This section provides background information related to the present disclosure which is not necessarily prior art.

Grain storage bins often include a grain bin unload trough conveyor under the bin floor that conveys material from within the grain bin to the exterior of the bin through the use of a conveying auger enclosed within a formed metal trough. An internal bin sweep conveyor located above the bin floor can be paired with such an unload trough conveyor to help convey grain inside the bin into the unload trough conveyor through control gates.

The auger should be held in a centered position within the trough to maintain a proper gap between the rotating auger flight and the walls of the trough. For example, the auger shaft can bow or bend when the auger extends a long distance or in response to grain acting on the auger as it is being conveyed down the trough by the auger. As shown in FIGS. 1 and 2, one existing auger positioning assembly 100 uses a hanger 102 that mates with a pair of metal trough brackets 104 that are bolted on opposite sides of the interior of the trough 106. The trough brackets 104 include support ramps 108 that are welded to plate members 110. The auger hanger 102 engages and slides upon the support ramps 108 into the operating height.

The auger housed within the trough must be removable through an end of the trough for periodic maintenance or in case of clogging, jamming, or failures. Thus, it is sometimes necessary to remove and replace the auger while grain remains within the bin, or the trough, or both. Unfortunately, such replacement of the auger can be problematic. For example, the auger flight can slide along the bottom of the trough, generating friction and potential part damage during insertion, before moving upwards along the angled ramp supports, before resting at the proper operational height. As another example, the auger hanger 102 can rotate on the shaft 56 as the auger is pushed into the trough 106 from the end. As a result, the auger hanger 102 can rotate to a position where it is not properly aligned to slide into and on the support ramps 108 by the time it is pushed down the trough 106 to the brackets 104. Such misalignment concerns can also restrict the ability to rotate the auger to more easily pass through grain in the trough while pushing or sliding the auger down the trough 106.

SUMMARY

This section provides a general summary of the disclosure, and is not a comprehensive disclosure of its full scope or all of its features.

In accordance with one aspect of the present disclosure, a grain bin unload trough conveyor auger hanger assembly can include a grain bin unload conveyor trough that has a wall profile including a lowermost wall portion having a curved shape, and a pair of side walls extending upwardly from the lowermost wall portion. Lower portions of the side walls can be spaced laterally from each other at a first interior lateral width, and upper portions of the side walls can be spaced laterally from each other at a second interior lateral width that is greater than the first interior lateral width. A shelf portion of each of the side walls can extend laterally outwardly from the lower portion to the upper portion of each of the side walls. A grain bin unload conveyor auger can have an auger shaft. An auger hanger can extend laterally across the conveyor trough and can be supported on the shelf portions of the side walls. The auger hanger can extend down to hold the auger shaft in the conveyor trough centrally within the first interior lateral width between the lower portions of the side walls.

In other aspects, the lower portions of the side walls cannot include any auger support components extending inwardly toward the grain bin unload conveyor auger. Sheet metal can form the wall profile, including the lowermost wall portion, and the lower portions, the shelf portions, and the upper portions of the side walls. The lower portions of the side walls can extend parallel to each other and to the upper portions of the side walls. The shelf portions can each extend laterally outwardly at an upward angle between the lower portions and the upper portions of the side walls.

In other aspects, the auger hanger can include a T-shaped member including a laterally extending horizontal arm with opposite distal ends being supported by the shelf portions, and an annular auger shaft coupling at a lower end of a vertically extending arm of the T-shaped member. The auger hanger can include a friction reducing pad engaging against the shelf portions. The shelf portions can each extend laterally outwardly at an upward angle between the lower portions and the upper portions of the side walls, and each friction reducing pad can have a lower surface that extends laterally outwardly at an angle matching the upward angle of the shelf portions.

In other aspects, a vertical stop can be coupled to each upper portion of the side walls and can be spaced above the shelf portion to sandwich ends of the auger hanger between the shelf portion and the vertical stop when the grain bin unload conveyor auger is in a final operational position within the grain bin unload conveyor trough. The vertical stop can be a bracket for an intermediate gated hopper. Hopper control rods can be positioned within the grain bin unload conveyor trough vertically above the auger hanger and laterally inwardly adjacent to the vertical stops.

In accordance with another aspect of the present disclosure, a method of positioning a grain bin unload conveyor auger that has an auger shaft that has an auger hanger coupled thereto, within a grain bin unload conveyor trough that has a pair of hanger support shelves extending longitudinally along the grain bin unload conveyor trough between an open exterior end and an interior end thereof can be provided. The method can include positioning the auger hanger on the pair of hanger support shelves at the open exterior end of the grain bin unload conveyor trough to support the grain bin unload conveyor auger away from adjacent interior surfaces of the grain bin unload conveyor trough (i.e., away from interior surfaces of the trough that are adjacent the auger hanger). The grain bin unload conveyor auger can be pushed through the open exterior end of the grain bin unload conveyor trough to cause the auger hanger to continuously support the grain bin unload conveyor auger away from the adjacent interior surfaces of the grain bin unload conveyor trough as the auger hanger moves longitudinally along the pair of hanger support shelves from the open exterior end to a final operational position of the auger hanger between the open exterior end and the interior end of the grain bin unload conveyor trough.

In other aspects, the pushing the grain bin unload conveyor auger can include sliding the auger hanger longitudinally along the pair of hanger support shelves. The auger hanger can include friction reducing pads, and the pushing the grain bin unload conveyor auger can include sliding the friction reducing pads of the auger hanger longitudinally along the pair of hanger support shelves. The pushing the grain bin unload conveyor auger can include the auger hanger moving to the final operational position in which the auger hanger can be sandwiched between the pair of hanger support shelves and a corresponding pair of vertical stops coupled to side walls of the grain bin unload conveyor trough.

In other aspects, the grain bin unload conveyor auger can have at least one additional auger hanger coupled to the auger shaft, and for each of the at least one additional auger hangers, the method can further include positioning the additional auger hanger on the pair of hanger support shelves at the open exterior end of the grain bin unload conveyor trough to support the grain bin unload conveyor auger away from adjacent interior surfaces of the grain bin unload conveyor trough. The grain bin unload conveyor auger can be pushed through the open exterior end of the grain bin unload conveyor trough to cause the additional auger hanger to continuously support the grain bin unload conveyor auger away from the adjacent interior surfaces of the grain bin unload conveyor trough as the additional auger hanger moves longitudinally along the pair of hanger support shelves from the open exterior end toward the interior end. The pushing the grain bin unload conveyor auger through the open exterior end of the grain bin unload conveyor trough to cause the auger hanger to continuously support the grain bin unload conveyor auger away from the adjacent interior surfaces of the grain bin unload conveyor trough as the auger hanger moves longitudinally along the pair of hanger support shelves from the open exterior end to the final operational position of the auger hanger between the open exterior end and the interior end of the grain bin unload conveyor trough can simultaneously move each additional auger hanger to a corresponding final operational position of each additional auger hanger between the open exterior end and the interior end of the grain bin unload conveyor trough.

In other aspects, the pushing the grain bin unload conveyor auger with each additional auger hanger can include sliding each additional auger hanger longitudinally along the pair of hanger support shelves. Each additional auger hanger can include friction reducing pads, and the pushing the grain bin unload conveyor auger with each additional auger hanger can include sliding the friction reducing pads of each additional auger hanger longitudinally along the pair of hanger support shelves. The pushing the grain bin unload conveyor auger with each additional auger hanger can include the auger hanger moving to the final operational position and each additional auger hanger moving to a corresponding final positon in which the auger hanger and each additional auger hanger is sandwiched between the pair of hanger support shelves and a corresponding pair of vertical stops coupled to side walls of the grain bin unload conveyor trough. A first of the at least one additional auger hanger can be coupled to an inner end of the auger shaft, and the method can further include uncoupling the first of the at least one additional auger hanger from the inner end of the auger shaft after the pushing the grain bin unload conveyor auger through the open exterior end of the grain bin unload conveyor trough moves the first of the at least one additional auger hanger to a corresponding final position of the first of the at least one additional auger hanger.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
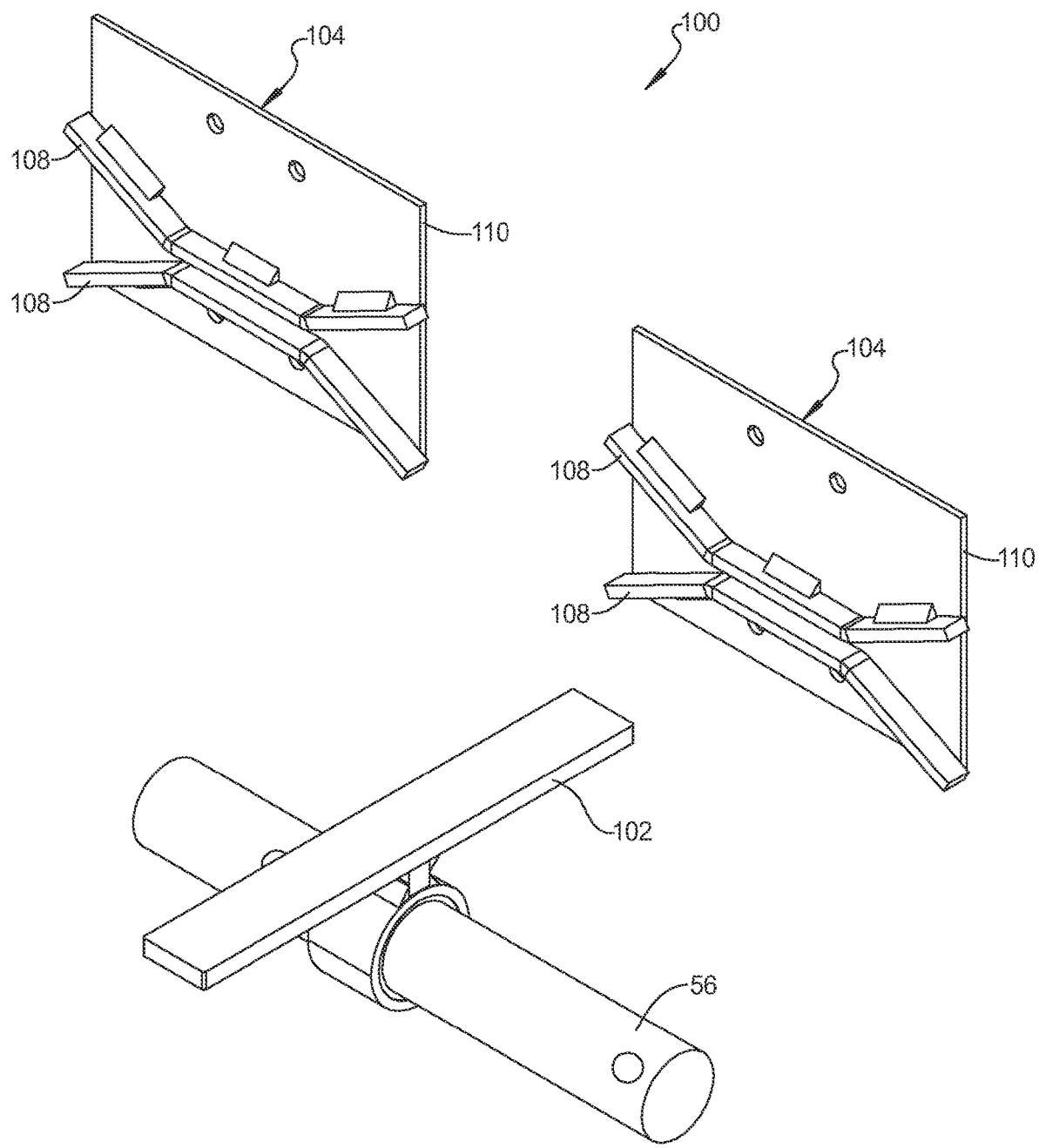
FIG. 1 is an exploded view of a prior art grain bin unload trough conveyor auger hanger assembly, and a portion of an auger shaft.

Example embodiments will now be described more fully with reference to the accompanying drawings.

With reference to FIGS. 3-11, one example of a grain bin unload trough conveyor auger hanger assembly 20 in accordance with the present disclosure is illustrated and described herein. The auger hanger assembly 20 is part of a grain bin unload trough conveyor 22, which is positioned below the floor of a grain bin, and receives grain from inside the grain bin through the floor via gated hoppers 24, 26 that can be selectively opened during the grain bin unloading process. There is typically a central hopper 24 or sump and additional intermediate hoppers 26 or sumps can also be provided. The grain bin unload trough conveyor 22 can be paired with interior sweep conveyors (not shown) that are positioned above the floor of the grain bin to move grain toward the central hopper 24.

The trough 30 of the grain bin unload trough conveyor 22 can be formed of a plurality of longitudinal trough segments that can be coupled together via coupling flanges 32. The trough 30 can have a cross-sectional shape or wall profile with a first or lower interior width 34 or span at a lower end 38 or wall portion. The cross-sectional shape or wall profile of the trough 30 can have a second or upper interior width 36 or span at an upper end 40 or wall portion that is larger than the lower interior width 34. The cross-sectional shape or wall profile of the trough 30 can include a shelf 42 or wall portion extending between the narrower lower end and the wider upper end. The side walls defining the upper and lower ends can be planar and parallel to each other. A lowermost end 44 or wall portion of the cross-sectional shape or wall profile of the trough 30 can have a generally arcuate or curved shape. The cross-sectional shape of the trough 30 can be uniform along its entire length.

An auger hanger 46 can include a metal T-shaped member 48 including an annular auger shaft coupling 50 at a lower or distal end of the vertical arm 52 of the T-shaped member 48. The auger shaft coupling 50 can include an annular inner bronze insert 54 between the metal of the T-shaped member 48 and the rotating auger shaft 56. Thus, the rotating auger shaft 56 contacts against the bronze insert 54, which reduces friction, wear, noise, etc., between the rotating auger shaft 56 and the auger shaft coupling 50. Alternatively, the bronze insert can be replaced by a bearing to further increase longevity, and reduce friction, wear, noise, etc.

Pads 58 can be provided on the opposite distal ends of the horizontal arm 60 of the T-shaped member 48. The pads 58 can be designed to reduce the amount of friction, wear, noise, etc., between the metal of the T-shaped member 48 and the sheet metal shelf 42 as the auger 62 is slid relative to the trough 30 during insertion and removal of the auger 62 from the trough 30. For example, the shelf 42 can extend at an upward angle from the smaller width lower end or wall 38 to the larger width upper end or wall 40 of the cross-section or side walls of the trough 30. The pads 58 can have a lower surface that extends at an angle matching the upward angle of the shelf 42. The contacting or engaging surfaces of the shelf 42 and the pads 58 can be planar and the planes thereof can be aligned parallel to each other.

Additionally or alternatively, the pads 58, or at least the contacting surfaces thereof, can be made of a material that reduces the amount of friction, wear, noise, etc., between the metal of the T-shaped member 48 and the shelf 42 as the auger 62 is slid relative to the trough 30. For example, the engaging surfaces or entirety of the pads 58 can be made of a plastic material, such as nylon, or a metal material, such as bronze.

In other options not illustrated herein, the metal T-shaped member 48, itself, can provide the engagement or support surface that directly engages against the cooperating engagement or support surface of the shelf 42. In one such example, the cooperating engagement surfaces of the metal T-shaped member 48 and the shelf 42 can all be planar surfaces that extend substantially horizontally and in alignment with each other.

A vertical stop 64 can be coupled to the upper end 40 of the wall of the trough 30 and spaced a distance above the shelf 42 so that the pads 58 are sandwiched between the shelf 42 and the vertical stop 64 when the auger is in its final or operating position within the trough 30. Thus, the auger hanger assembly 20 supports or holds the auger 62 at the proper height or vertical position and at the proper lateral or horizontal position within the trough 30, against upward, downward, left, and right forces acting on the auger 62 by the grain or gravity. For example, the grain being conveyed by the auger 62 could become jammed or clogged within the trough 30 exerting such forces on the auger 62.

The vertical stop 64 can be a support or coupling bracket 64 for an intermediate gated hopper 26. The opening of the intermediate gated hopper 26 can have a width 34 that is equivalent to the lower interior width 34 of the trough 30. The cooperating engaging or support surfaces of the shelf 42 and pads 58 are positioned laterally outwardly of the lower side walls 38 having this lower interior width 34 of the trough 30. This is in contrast to the plate members 110 and support ramps 108 providing the engaging or supporting surfaces of FIGS. 1 and 2, which both extend laterally inwardly from the lower side walls 38 and into the lower interior width 34.

Figure 2:
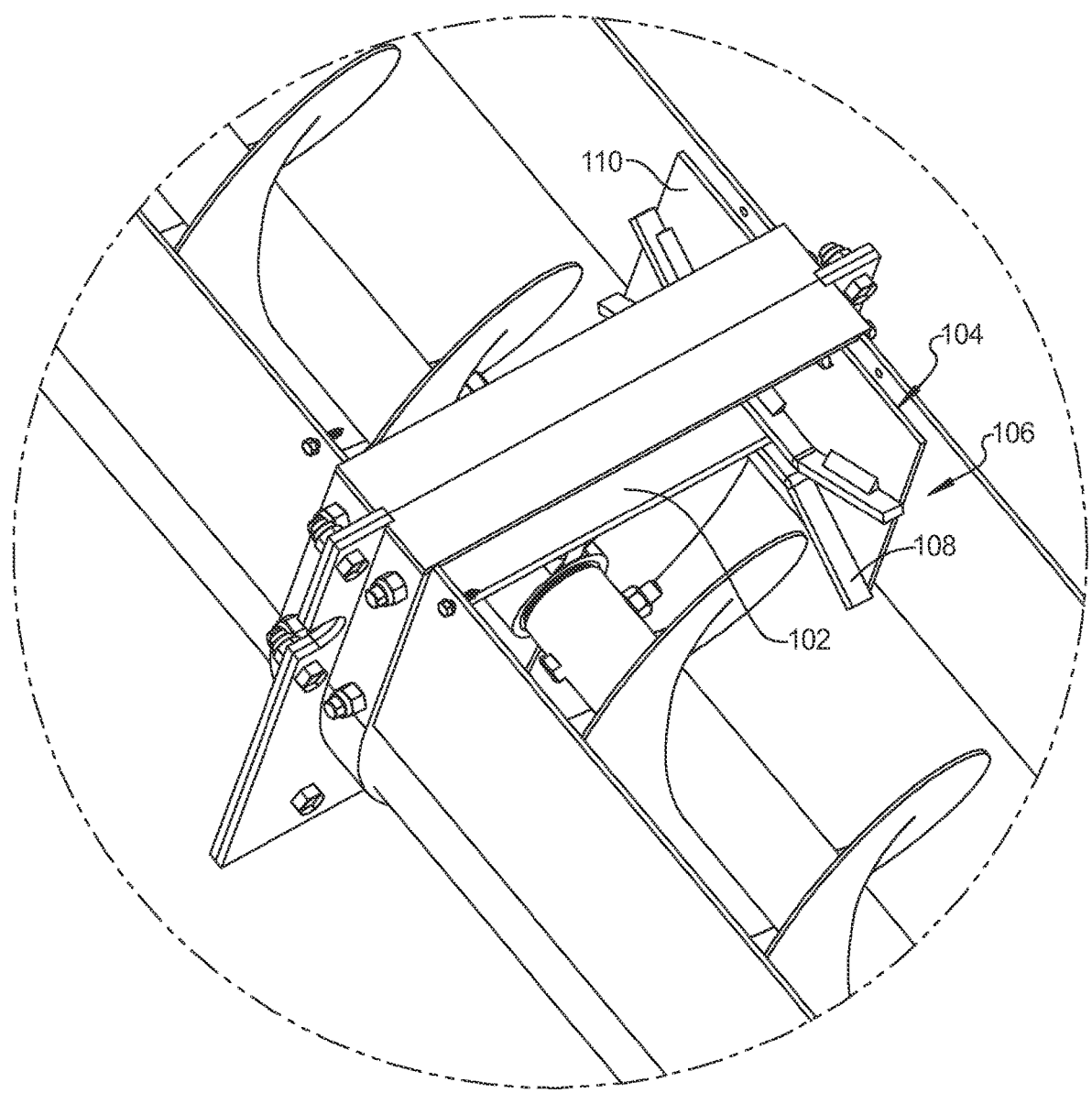
FIG. 2 is a partial perspective view of the prior art grain bin unload trough conveyor auger hanger assembly of FIG. 1 mounted in a trough.
Figure 3:
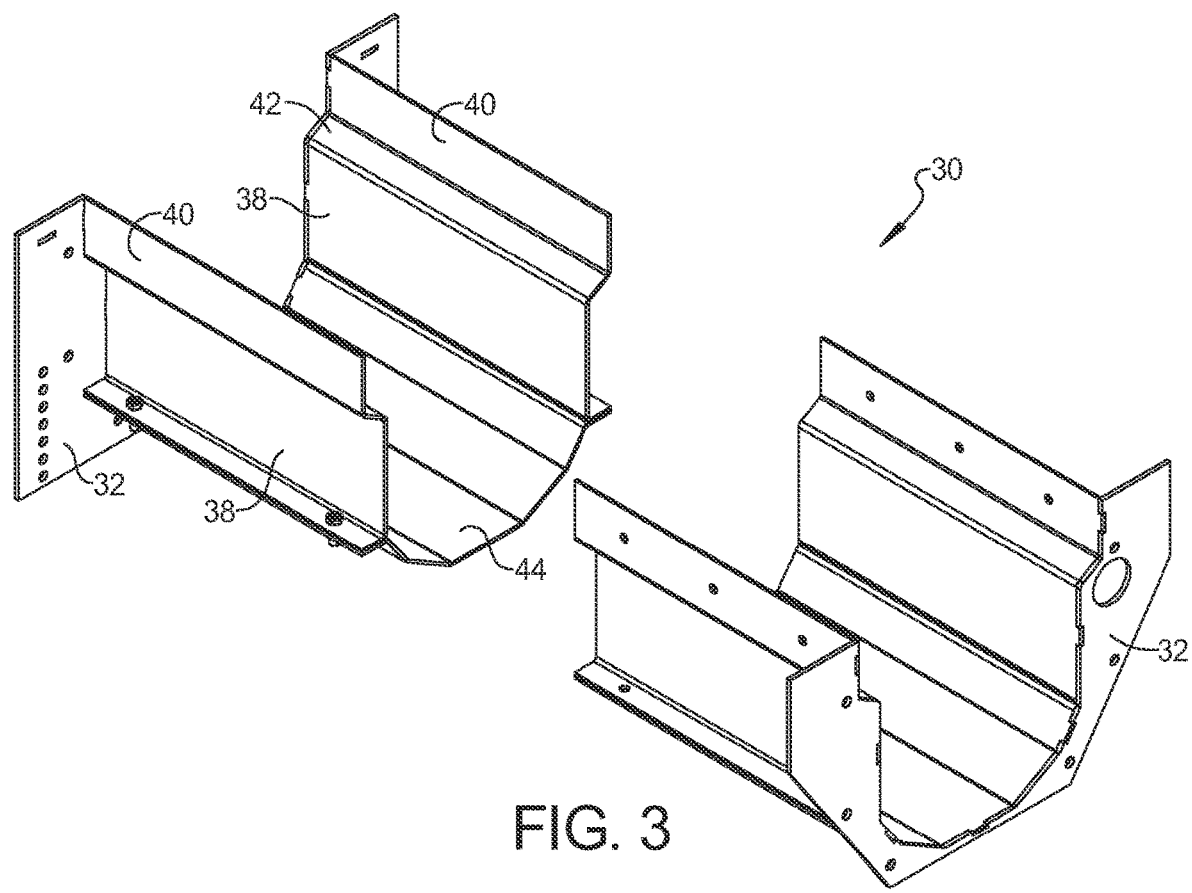
FIG. 3 is a perspective view of end portions of a segment of a trough of an exemplary grain bin unload trough conveyor auger hanger assembly in accordance with the present disclosure.
Figure 4:
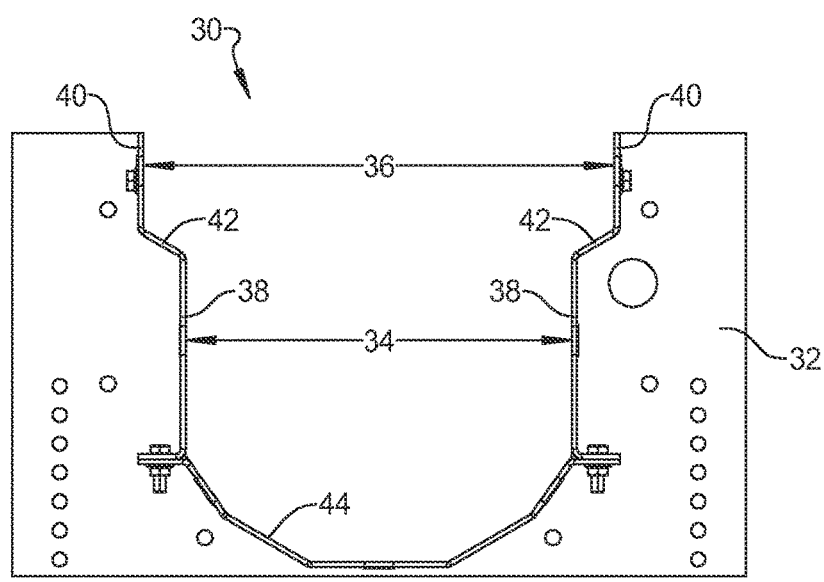
FIG. 4 is an end elevation view of the trough of FIG. 3.
Figure 5:
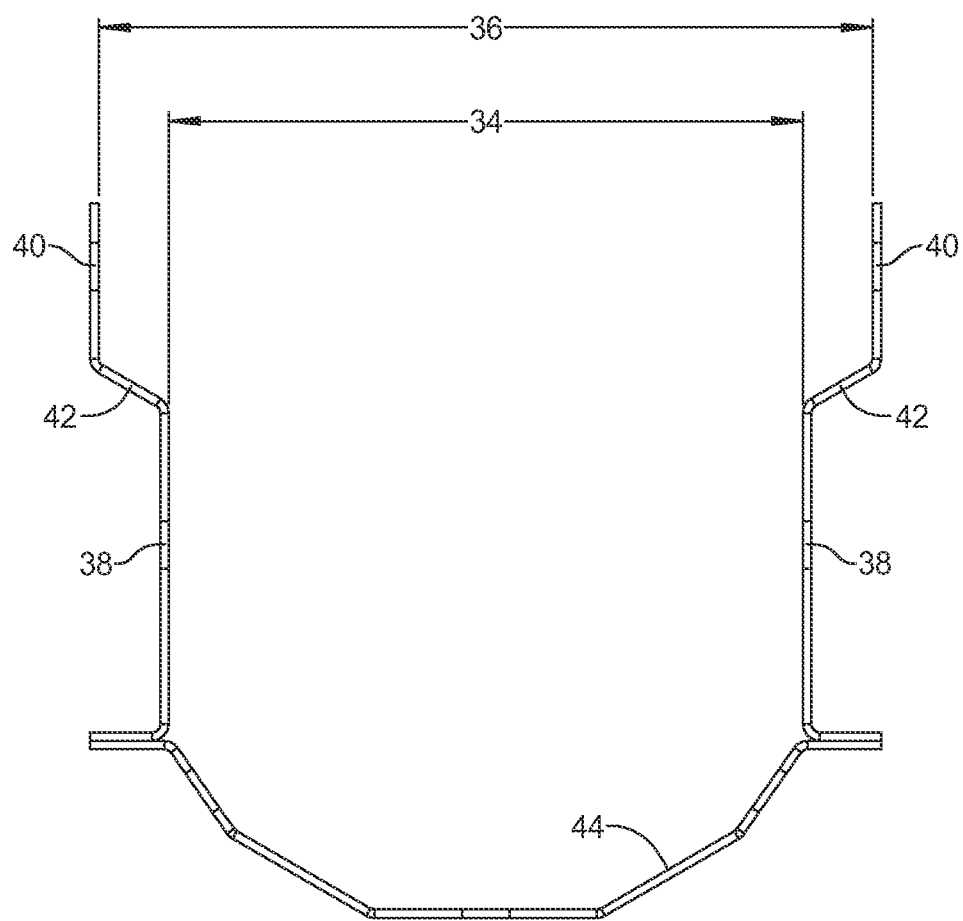
FIG. 5 is a transverse cross-section view of the trough of FIG. 3.
Figure 6:
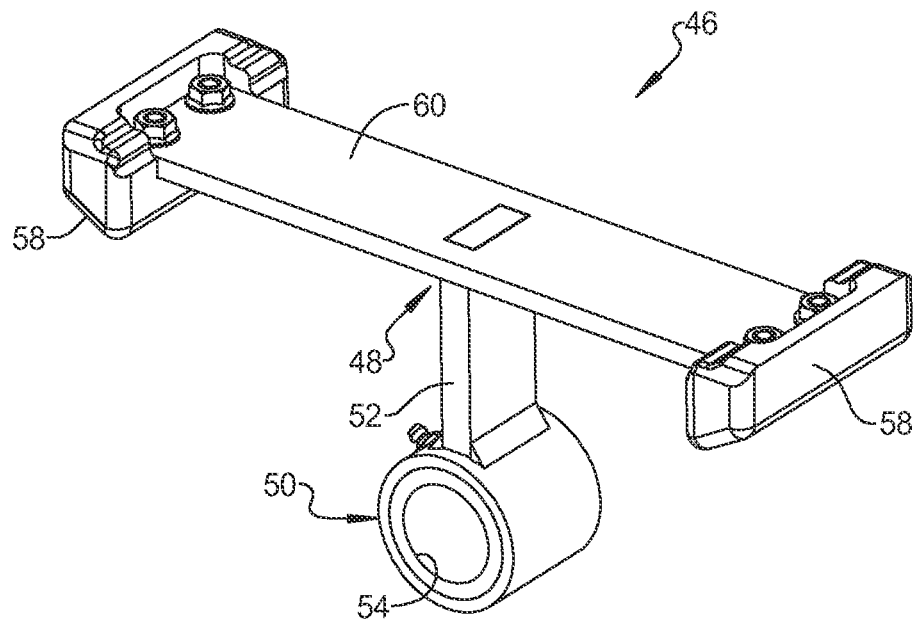
FIG. 6 is a perspective view of an auger hanger for use with the trough of FIG. 3 in the exemplary grain bin unload trough conveyor auger hanger assembly in accordance with the present disclosure.
Figure 7:
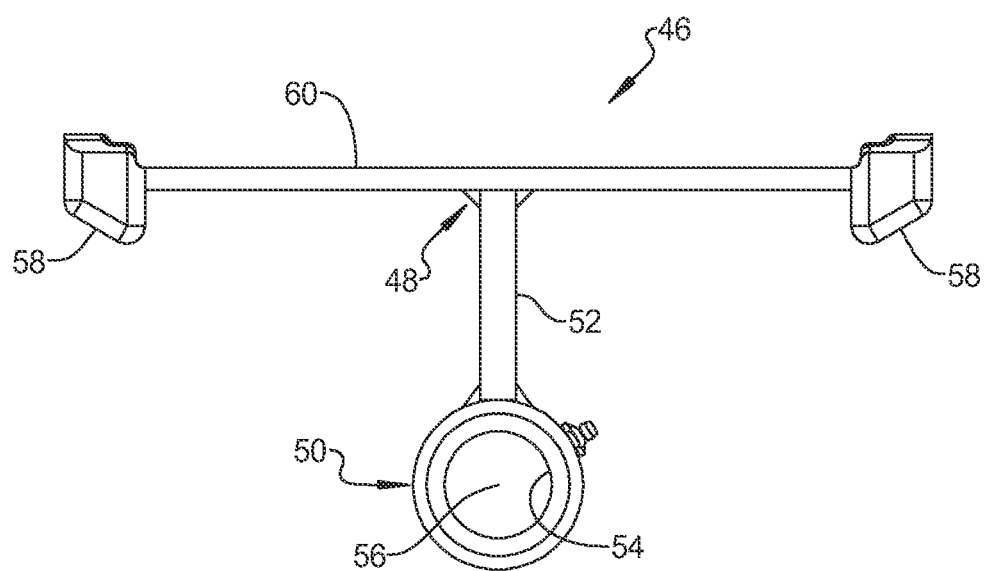
FIG. 7 is an end elevation view of the auger hanger of FIG. 6.
Figure 8:
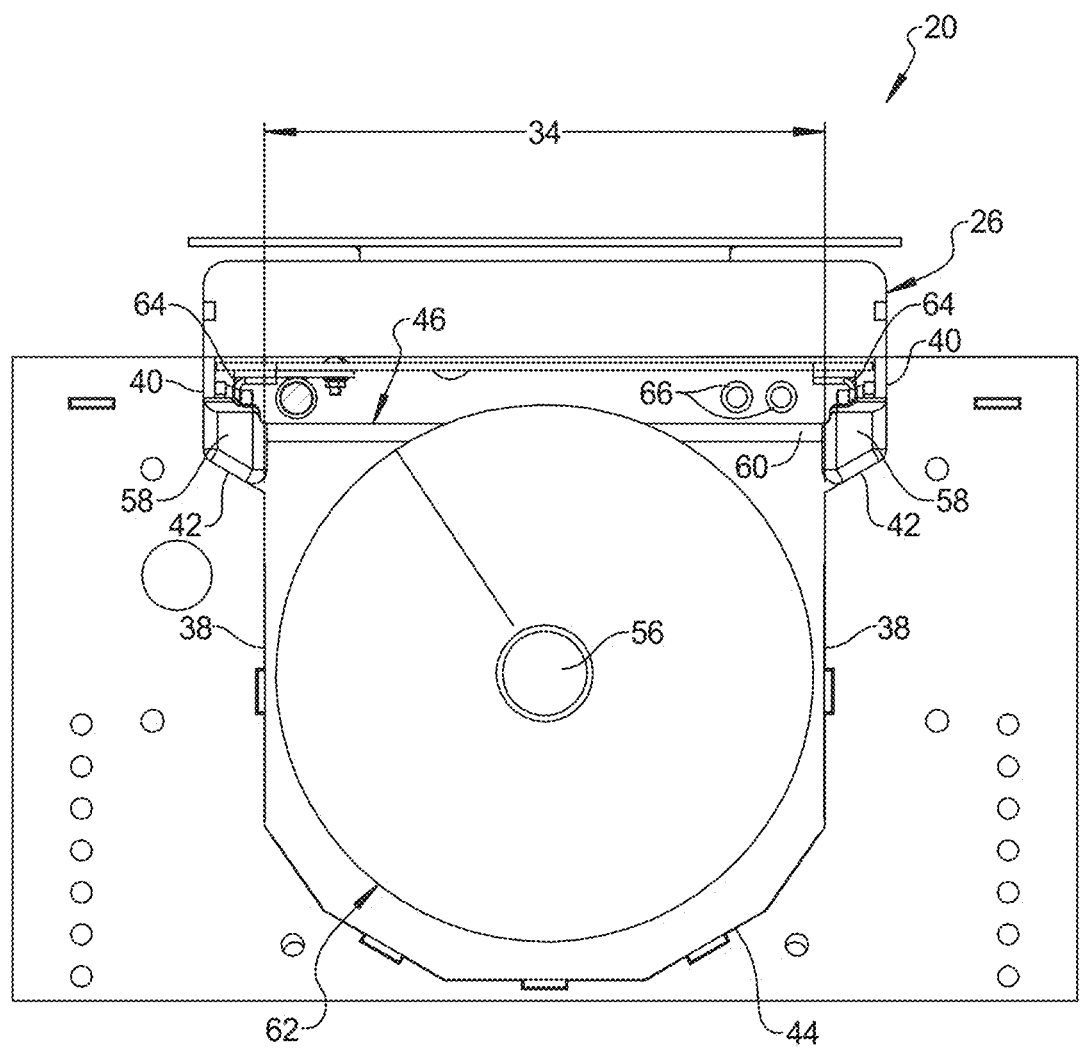
FIG. 8 is an end elevation view of the exemplary grain bin unload trough conveyor auger hanger assembly in accordance with the present disclosure, and incorporating the exemplary trough of FIGS. 3-5 and auger hanger of FIGS. 6-7.
Figure 9:
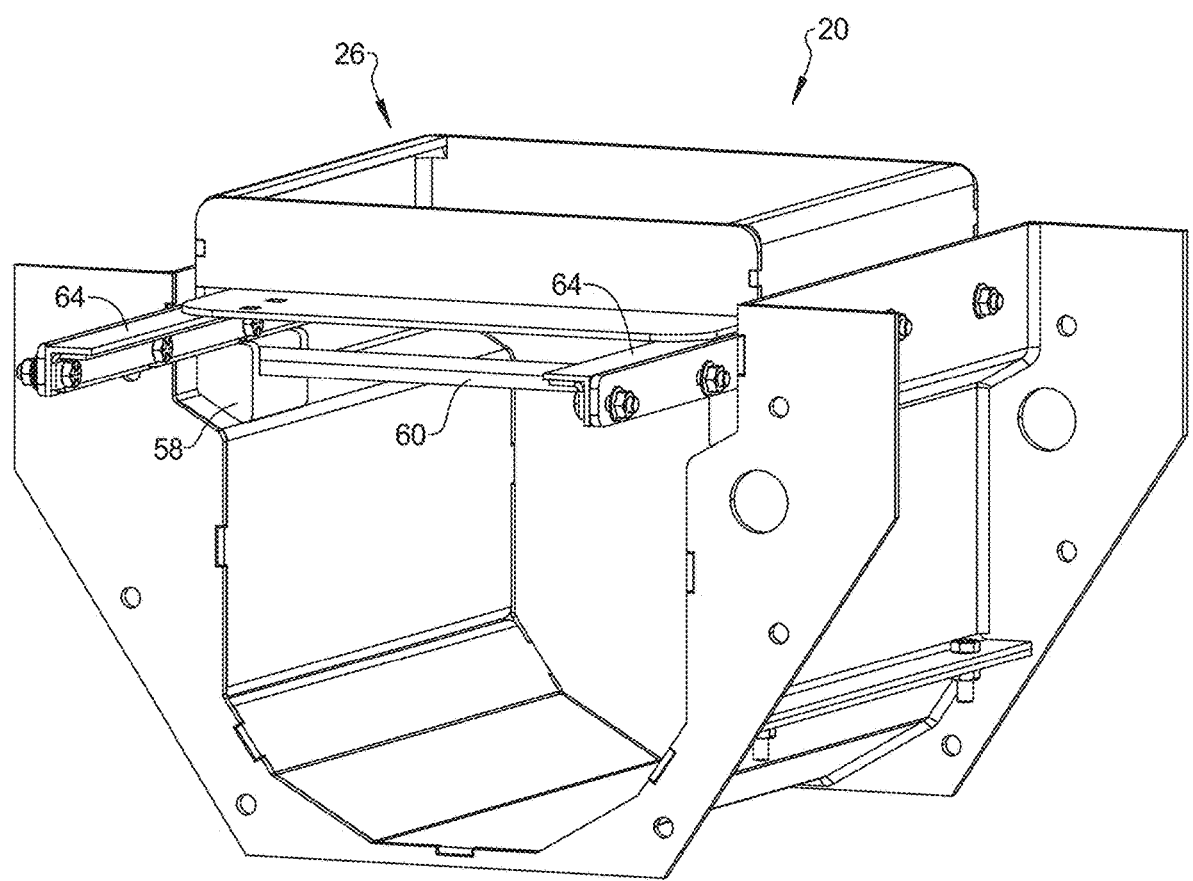
FIG. 9 is a partial perspective view of the exemplary grain bin unload trough conveyor auger hanger assembly of FIG. 8.
Figure 10:
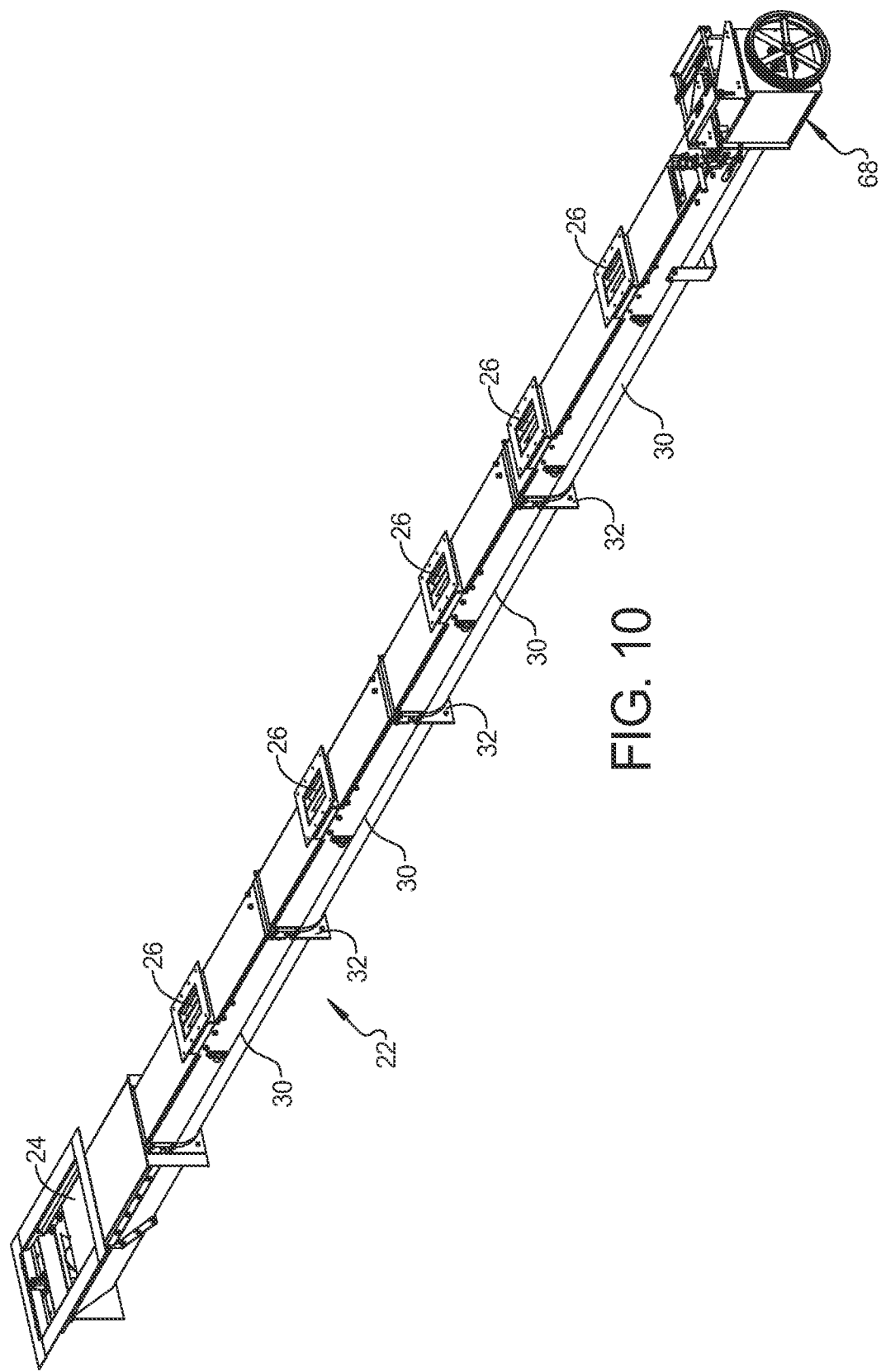
FIG. 10 is a perspective view of an exemplary grain bin unload trough conveyor auger, in which the auger hanger assembly of FIGS. 3-9 can be employed in accordance with the present disclosure.

Thus, to the extent the cooperating engaging or support surfaces of the shelf 42 and pads 58 have any effect on the flow of grain being conveyed by the auger 62 through the trough 30 at all, such effect is much less than that of the plate members 110 and the support ramps 108 providing the engaging surfaces of FIGS. 1 and 2. In addition, the lack of encroachment into the lower interior width 34 of the trough 30 means that the cooperating engaging or support surfaces of the shelf 42 and pads 58 does not need to be taken into account in sizing or positioning the auger 62 with respect to the trough 30. For example, the lateral gap between the auger 62 and the lower side walls 38 can be less than with the plate members 110 and the support ramps 108 engaging or coupling surfaces of FIGS. 1 and 2. This can increase the conveying efficiency of the grain bin unload trough conveyors 22.

Control rods 66 or service lines, or both, can also be positioned vertically above the T-shaped member 48 of the auger hanger 46 and horizontally or laterally inwardly adjacent to the vertical stops 64. For example, each control rod 66 can be coupled to one or more of the gated center hopper 24 and gated intermediate hoppers 26 to selectively open and close the gates thereof.

The auger hanger 46 is coupled to the auger shaft 56 of the auger 62. For example, the auger shaft 56 can be mounted through the annular auger shaft coupling 50 at a joint between two auger segments. Thus, the auger hanger 46 can be longitudinally fixed, but rotationally movable relative to the longitudinally extending auger shaft 56.

As noted above, the auger 62 housed within the trough 30 must be removable through an end of the trough 30 for periodic maintenance or in case of clogging, jamming, or failures. This typically involves removing the drive components 68 from the bin exterior end or drive end of the auger 62 and trough 30. The auger 62 can then be inserted or removed through the open exterior end of the trough 30. When inserting the auger 62, the auger 62 is slid into the trough 30 until an auger hanger 46 is at the open end. The auger hanger can be aligned with and manually positioned on the shelf 42 by a worker while it is at the open end of the trough 30. The auger hanger 46 then slides upon the shelf 42 during further sliding of the auger 62 into the trough 30. In some cases, multiple auger hangers can be provided along the auger shaft 56. For example, an auger hanger 46 can be permanently or temporarily (during insertion or removal) mounted on the inner end of the auger shaft 56, and one or more additional auger hangers 46 can be mounted at intermediate positions along the shaft 56.

As in this example, the shelf 42 can be formed as a part of the side walls of the trough 30, and can continuously longitudinally extend from one end of the trough 30 to the final position of the auger hanger 46. Once the pads 58 of the auger hanger 46 are oriented and placed on the shelves 42 at the open end of the trough 30, the auger hanger 46 remains properly positioned and oriented as a result of the engagement between the pads 58 and the shelves 42. When fully inserted into its final or operational position within the trough 30, the pads 58 of the auger hanger 46 come into position below corresponding vertical stops 64, sandwiching the auger hanger 46 between the shelves 42 and the corresponding vertical stops 64.

Because the auger hanger 46 remains properly positioned and oriented as a result of the engagement between the pads 58 and the shelves 42, the auger 62 can be rotated as it is being slid into or out of the trough without fear of misaligning the cooperating engagement surfaces of the pads 58 and the shelves 42. Such rotation of the auger 62 can be beneficial to sliding the auger 62 relative to the trough 30, for example, when grain remains in the trough 30.

As should be apparent, misalignment like that which can occur with the hanger assembly of FIGS. 1 and 2 cannot easily be corrected at or near the final position of the auger 62, when the only open access is 10 or more feet away at the bin exterior end or drive end of the auger 62 and trough 30. This is one reason why there are no fasteners that need to be tightened or loosened at or near the final position or operational position of the auger hanger 46. The auger hanger 46 simply needs to be slid into a sandwiched position between the shelf 42 and the vertical stop 64.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of positioning a grain bin unload conveyor auger within a grain bin unload conveyor trough that has a pair of hanger support shelves extending longitudinally along the grain bin unload conveyor trough between an open exterior end and an interior end thereof, the grain bin unload conveyor auger including an auger shaft that has an auger hanger coupled thereto, the method comprising:
    positioning the auger hanger on the pair of hanger support shelves at the open exterior end of the grain bin unload conveyor trough to support the grain bin unload conveyor auger away from adjacent interior surfaces of the grain bin unload conveyor trough; and
    pushing the grain bin unload conveyor auger through the open exterior end of the grain bin unload conveyor trough to cause the auger hanger to continuously support the grain bin unload conveyor auger away from the adjacent interior surfaces of the grain bin unload conveyor trough as the auger hanger moves longitudinally along the pair of hanger support shelves from the open exterior end to a final operational position of the auger hanger between the open exterior end and the interior end of the grain bin unload conveyor trough.

2. The method of positioning a grain bin unload conveyor auger of claim 1, wherein pushing the grain bin unload conveyor auger includes sliding the auger hanger longitudinally along the pair of hanger support shelves.

3. The method of positioning a grain bin unload conveyor auger of claim 2, wherein the auger hanger includes friction reducing pads and pushing the grain bin unload conveyor auger includes sliding the friction reducing pads of the auger hanger longitudinally along the pair of hanger support shelves.

4. The method of positioning a grain bin unload conveyor auger of claim 1, wherein pushing the grain bin unload conveyor auger includes moving the auger hanger to the final operational position in which the auger hanger is sandwiched between the pair of hanger support shelves and a corresponding pair of vertical stops coupled to side walls of the grain bin unload conveyor trough.

5. The method of positioning a grain bin unload conveyor auger of claim 1, wherein the grain bin unload conveyor auger has at least one additional auger hanger coupled to the auger shaft, and for each of the at least one additional auger hangers, the method further comprises:
    positioning the additional auger hanger on the pair of hanger support shelves at the open exterior end of the grain bin unload conveyor trough to support the grain bin unload conveyor auger away from the adjacent interior surfaces of the grain bin unload conveyor trough; and
    pushing the grain bin unload conveyor auger through the open exterior end of the grain bin unload conveyor trough to cause the additional auger hanger to continuously support the grain bin unload conveyor auger away from the adjacent interior surfaces of the grain bin unload conveyor trough as the additional auger hanger moves longitudinally along the pair of hanger support shelves from the open exterior end to the final operational position of the auger hanger between the open exterior end and the interior end of the grain bin unload conveyor trough,
    wherein pushing the grain bin unload conveyor auger through the open exterior end of the grain bin unload conveyor trough to cause the auger hanger to continuously support the grain bin unload conveyor auger away from the adjacent interior surfaces of the grain bin unload conveyor trough as the auger hanger moves longitudinally along the pair of hanger support shelves from the open exterior end to the final operational position of the auger hanger between the open exterior end and the interior end of the grain bin unload conveyor trough simultaneously moves each additional auger hanger to a corresponding final operational position of each additional auger hanger between the open exterior end and the interior end of the grain bin unload conveyor trough.

6. The method of positioning a grain bin unload conveyor auger of claim 5, wherein pushing the grain bin unload conveyor auger with each additional auger hanger includes sliding each additional auger hanger longitudinally along the pair of hanger support shelves.

7. The method of positioning a grain bin unload conveyor auger of claim 5, wherein each additional auger hanger includes friction reducing pads and pushing the grain bin unload conveyor auger with each additional auger hanger includes sliding the friction reducing pads of each additional auger hanger longitudinally along the pair of hanger support shelves.

8. The method of positioning a grain bin unload conveyor auger of claim 5, wherein pushing the grain bin unload conveyor auger with each additional auger hanger includes the auger hanger moving to the final operational position and each additional auger hanger moving to a corresponding final position in which the auger hanger and each additional auger hanger is sandwiched between the pair of hanger support shelves and a corresponding pair of vertical stops coupled to side walls of the grain bin unload conveyor trough.

9. The method of positioning a grain bin unload conveyor auger of claim 5, wherein a first of the at least one additional auger hanger is coupled to an inner end of the auger shaft, and the method further comprises uncoupling the first of the at least one additional auger hanger from the inner end of the auger shaft after pushing the grain bin unload conveyor auger through the open exterior end of the grain bin unload conveyor trough and thereby moving the first of the at least one additional auger hanger to a corresponding final position of the first of the at least one additional auger hanger.

* * * * *